(12) United States Patent
Hidaka (10) Patent No.: US 7,694,998 B2
(45) Date of Patent: Apr. 13, 2010

(54) AIRBAG APPARATUS HAVING EASILY-BENDING PORTION FORMED IN BACK-SIDE COVER

(75) Inventor: Nobuyuki Hidaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 660 days.

(21) Appl. No.: 11/464,974

(22) Filed: Aug. 16, 2006

(65) Prior Publication Data
US 2007/0052220 A1    Mar. 8, 2007

(30) Foreign Application Priority Data
Sep. 2, 2005    (JP) .............................. 2005-254930

(51) Int. Cl.
*B60R 21/16*    (2006.01)
(52) U.S. Cl. .............. 280/728.2; 280/728.3; 280/730.2; 280/749
(58) Field of Classification Search .............. 280/728.2, 280/728.3, 730.2, 749; 296/39.1, 214
See application file for complete search history.

(56) References Cited

U.S. PATENT DOCUMENTS

| | | | |
|---|---|---|---|
| 6,217,061 B1 | 4/2001 | Harland et al. | |
| 6,336,651 B1 * | 1/2002 | Mramor et al. | 280/728.2 |
| 6,439,598 B1 * | 8/2002 | Braun et al. | 280/728.2 |
| 6,974,151 B2 * | 12/2005 | Ochiai et al. | 280/728.2 |
| 7,011,337 B2 * | 3/2006 | Aoki et al. | 280/730.2 |
| 7,246,817 B2 * | 7/2007 | Tanase | 280/730.2 |
| 2001/0040361 A1 * | 11/2001 | Tajima et al. | 280/728.2 |
| 2003/0006590 A1 * | 1/2003 | Aoki et al. | 280/730.2 |

FOREIGN PATENT DOCUMENTS

| | | |
|---|---|---|
| JP | 09-240409 | 9/1997 |
| JP | 10-138861 | 5/1998 |
| JP | 2000-168482 | 6/2000 |
| JP | 2002-211345 | 7/2002 |
| JP | 2002-362283 | 12/2002 |
| JP | 2003-252161 | 9/2003 |
| JP | 2004-352087 | 12/2004 |
| JP | 2005-053366 | 3/2005 |

* cited by examiner

*Primary Examiner*—Eric Culbreth
(74) *Attorney, Agent, or Firm*—Rankin, Hill & Clark LLP (57) ABSTRACT

An airbag apparatus includes a back-side cover provided at a roof side rail which is provided on a side of a roof of a vehicle and extends in a front-back direction of the vehicle, wherein the back-side cover is arranged on a side of the roof side rail, which faces an interior of the vehicle; an interior-side cover for covering a side of the back-side cover, which faces the interior; and an airbag contained in a case formed by the back-side cover and the interior-side cover. An easily-bending portion is formed in the middle of the back-side cover along vertical directions thereof, and the easily-bending portion bends when receiving a pushing pressure from the airbag which is deploying, and the airbag deploys toward the interior through a space between the back-side cover and the interior-side cover which open in accordance with the bending of the easily-bending portion.

14 Claims, 12 Drawing Sheets

AIRBAG APPARATUS HAVING EASILY-BENDING PORTION FORMED IN BACK-SIDE COVER

BACKGROUND OF THE INVENTION

1. Field of the Invention

The present invention relates to an airbag apparatus provided at a roof side rail which is provided on a side of the roof of a vehicle and extends in the front-back direction of the vehicle.

Priority is claimed on Japanese Patent Application No. 2005-254930, filed Sep. 2, 2005, the content of which is incorporated herein by reference.

2. Description of the Related Art

An airbag apparatus called a "side curtain airbag" is known, in which an airbag is provided along an inner face (i.e., facing the interior of a vehicle) of a roof side rail which is provided on a side of the roof and extends in the front-back direction of the vehicle, and the airbag is deployed downward along the inner face of a window. In an example of such an airbag apparatus, an airbag is contained in a roof side rail garnish for covering the inner face of the roof side rail, and when the airbag is deployed, the roof side rail garnish, which receives a pushing force from the airbag, is bent at an easily-bending thin portion (i.e., having a smaller thickness in comparison with other portions) formed therein, so as to produce an opening through which the airbag is deployed (see Japanese Unexamined Patent Application, First Publication No. 2005-53366).

In another example as a similar airbag apparatus, the upper end of the roof side rail garnish and the upper end of an attachment plate part arranged on the back side of the roof side rail garnish are coupled in a hinge form via an easily-bending portion, and when the airbag is deployed, the roof side rail garnish, which receives a pushing force from the airbag, rotates around the easily-bending portion, so as to produce an opening through which the airbag is deployed (see Japanese Unexamined Patent Application, First Publication No. H9-240409).

When a thin portion is formed in the roof side rail garnish as explained above, the thin portion may influence surface property, or may produce an undesirable appearance.

In addition, in such a structure in which the upper end of the roof side rail garnish and the attachment plate part arranged on the back side thereof are coupled in the hinge form, a hinge part is formed in an end portion of the coupled body and thus it is difficult to secure appropriate mechanical strength at this part.

SUMMARY OF THE INVENTION

In light of the above circumstances, an object of the present invention is to provide an airbag apparatus having a desirable appearance and appropriate mechanical strength.

Therefore, the present invention provides an airbag apparatus (e.g., an airbag apparatus 11 or 1100 in embodiments explained later) comprising:

a back-side cover (e.g., a back-side cover 22 in the embodiments) provided at a roof side rail (e.g., a roof side rail 15 in the embodiments) which is provided on a side of a roof (e.g., a roof 14 in the embodiments) of a vehicle and extends in a front-back direction of the vehicle, wherein the back-side cover is arranged on a side of the roof side rail, which faces an interior of the vehicle;

an interior-side cover (e.g., an interior-side cover 21 in the embodiments) for covering a side of the back-side cover, which faces the interior; and an airbag (e.g., an airbag 16 in the embodiments) contained in a case (e.g., a case 23 in the embodiments) formed by the back-side cover and the interior-side cover, wherein an easily-bending portion (e.g., easily-bending portions 58 or 145 in the embodiments) is formed in the middle of the back-side cover along vertical directions thereof, and the easily-bending portion bends when receiving a pushing pressure from the airbag which is deploying; and the airbag deploys toward the interior through a space between the back-side cover and the interior-side cover which open in accordance with the bending of the easily-bending portion.

In accordance with the above structure, when the airbag is deployed, the pushing force due to the deployment bends the easily-bending portion formed in the middle of the back-side cover along the vertical directions, which is positioned near the roof side rail, so that the back-side cover and the interior-side cover (which covers a side of the back-side cover, which faces the interior of the vehicle) open, and the airbag further deploys through a space generated by the opening. The easily-bending portion for deploying the airbag is formed in the back-side cover; thus, it is unnecessary to form such an easily-bending portion in the interior-side cover, and the surface property of the interior-side cover is not influenced by the easily-bending portion. In addition, each easily-bending portion is provided in the middle of the back-side cover along the vertical direction. Thus, appropriate strength can be provided in comparison with the case of forming the easily-bending portion at the end of the back-side cover. Therefore, a desirable appearance can be obtained, and simultaneously, appropriate strength can be provided.

In addition, the airbag is contained in the case consisting of the back-side cover and the interior-side cover; thus, these elements can be easily attached to the vehicle body and it is possible to prevent the airbag from scarring or the like when the airbag is attached. As the case consists of the back-side cover and the interior-side cover, the interior-side cover can also be applied to vehicles in which no airbag is provided.

In a typical example, upper end portions of the back-side cover and the interior-side cover are overlapped and joined to each other, and the easily-bending portion is formed along a line under the upper end portions.

Typically, portions other than the upper end portion and the easily-bending portion of the back-side cover are fastened to a body of the vehicle.

Accordingly, when the airbag is deployed, the upper end portion of the back-side cover, which is positioned above the easily-bending portion, and the interior-side cover whose upper end portion joined to the upper end portion of the back-side cover rotate around the easily-bending portion which is bending, so that the lower portions of the back-side cover and the interior-side cover are separated from each other, and the airbag is further deployed toward the interior of the vehicle. That is, the upper end portions of the back-side cover and the interior-side cover are overlapped and joined, and thus have high rigidity, and the easily-bending portion of the back-side cover is formed along a line under this high-rigidity portion. Therefore, the easily-bending portion can be easily and reliably bent, and the lower portions of the back-side cover and the interior-side cover can be greatly separated from each other even when the amount of bending of the easily-bending portion is small.

In a preferable example, the back-side cover has a rib (e.g., a rib 52 in the embodiments), and the easily-bending portion is formed along an upper end of the rib.

In this case, the rib for improving the rigidity is formed in the back-side cover, and the easily-bending portion is formed along the upper end of the rib; thus, the easily-bending portion can be easily and reliably bent.

In another preferable example, an interior finishing member (e.g., an attachment base plate 90 and a passenger's handle 95 in the embodiments) is fastened to a body of the vehicle, and is detachably engaged with the interior-side cover.

In this case, the interior finishing member is detachably engaged with the interior-side cover. Therefore, even in the structure in which the interior finishing member is attached to the vehicle body, the interior-side cover can be detached from the interior finishing member and preferably separated from the back-side cover when the airbag is deployed.

Also in this case, the interior-side cover may have an opening through which the interior finishing member fastened to the body of the vehicle can pass.

In a typical example, the interior finishing member is a passenger's handle.

DETAILED DESCRIPTION OF THE INVENTION

Hereinafter, embodiments in accordance with the present invention will be described with reference to the appended figures.

An airbag apparatus 11 as a first embodiment of the present invention will be explained with reference to FIGS. 1 to 8. In the present embodiment, two airbag apparatuses 11 are provided on both sides of a vehicle.

Figure 1:
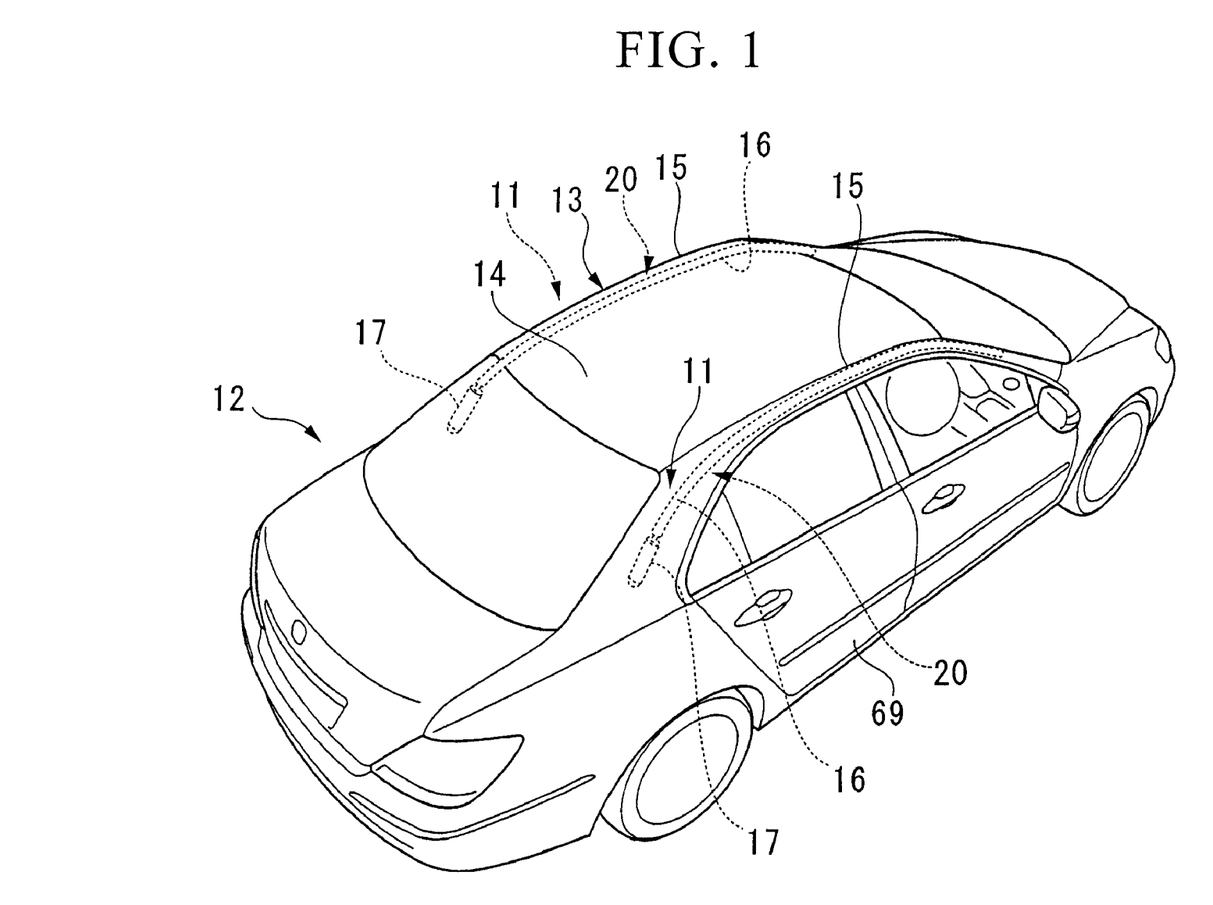
FIG. 1 is a perspective view of a vehicle to which the airbag apparatus as a first embodiment of the present invention is applied.

FIG. 1 is a perspective view of a vehicle 12, obliquely viewed from a right and back position. The vehicle 12 has a vehicle body 13 having a roof 14, and a pair of roof side rails 15 is arranged in the front-back direction on both sides of the roof 14. An airbag 16 is arranged on an inner face side (i.e., facing the interior of the vehicle) of each roof side rail 15. An inflator 17 for generating a gas so as to expand and deploy the airbag 16 is attached to the back side of each airbag 16 in the front-back direction of the vehicle.

Figure 2:
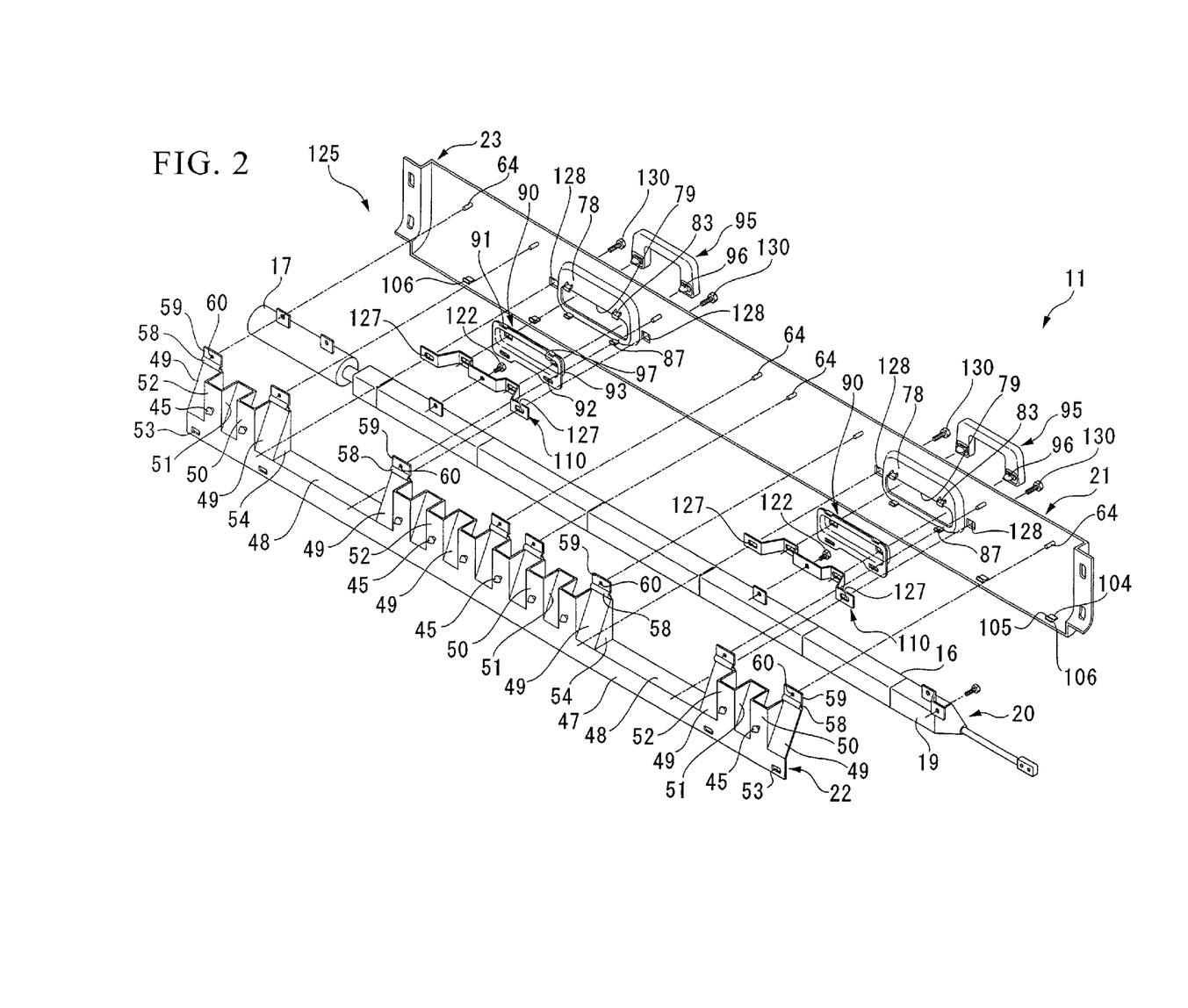
FIG. 2 is an exploded perspective view showing the airbag apparatus of the first embodiment.

As shown in FIG. 2, each airbag apparatus 11 of the first embodiment has (i) an airbag module 20 which consists of the airbag 16 and the inflator 17 and has an elongated shape, (ii) an interior-side cover 21 which is made of synthetic resin, has an elongated shape, and is arranged on one side of the airbag module 20, and (iii) a back-side cover 22 which is made of synthetic resin (e.g., polypropylene or thermoplastic polyolefin resin), has an elongated shape, and is arranged on the other side of the airbag module 20.

Figure 3:
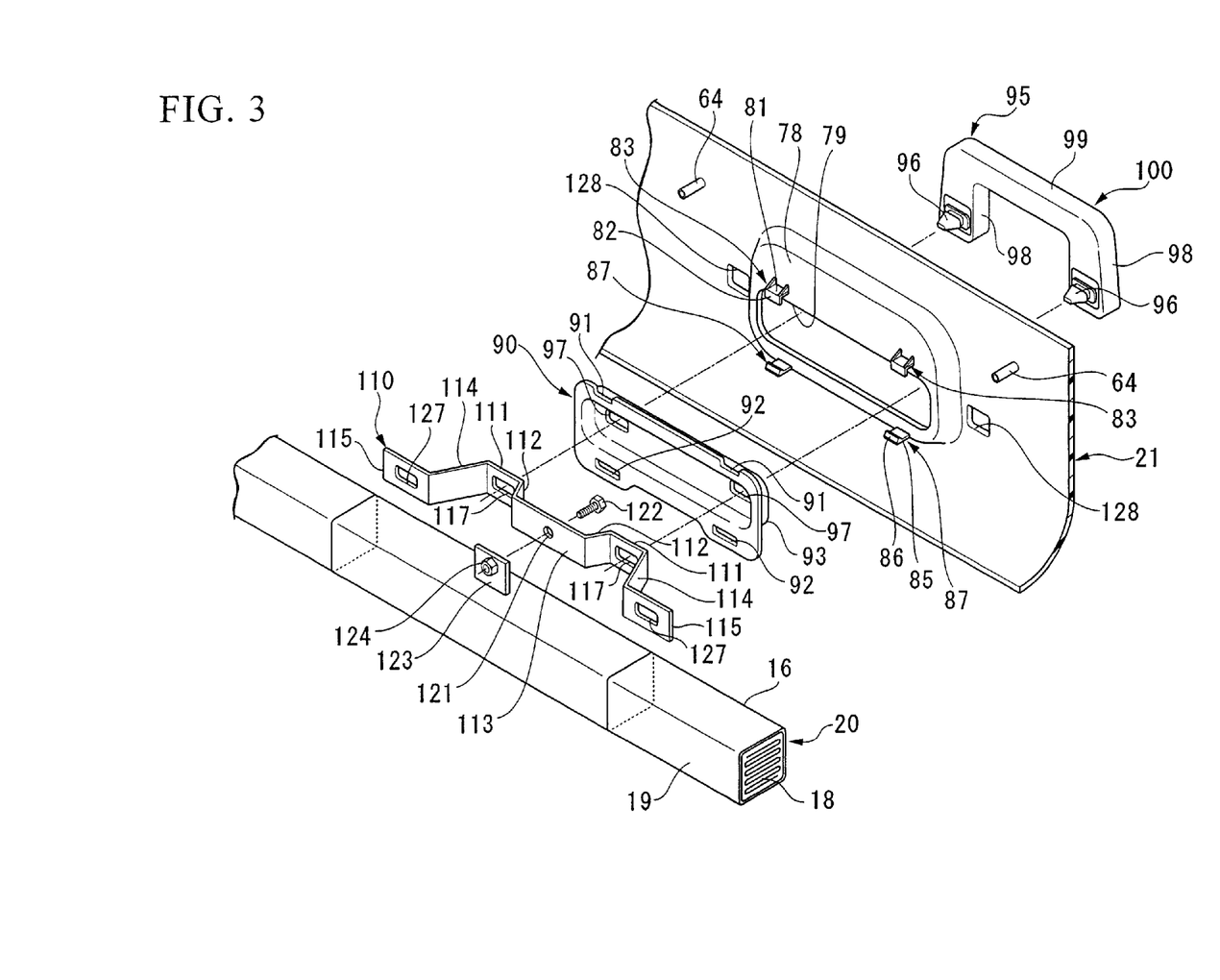
FIG. 3 is a partially-enlarged exploded perspective view showing the airbag apparatus of the first embodiment.

As shown in FIG. 3, the airbag 16 consists of an airbag main body 18 to be expanded and deployed, and a cover 19 for covering the folded airbag.

Figure 4:
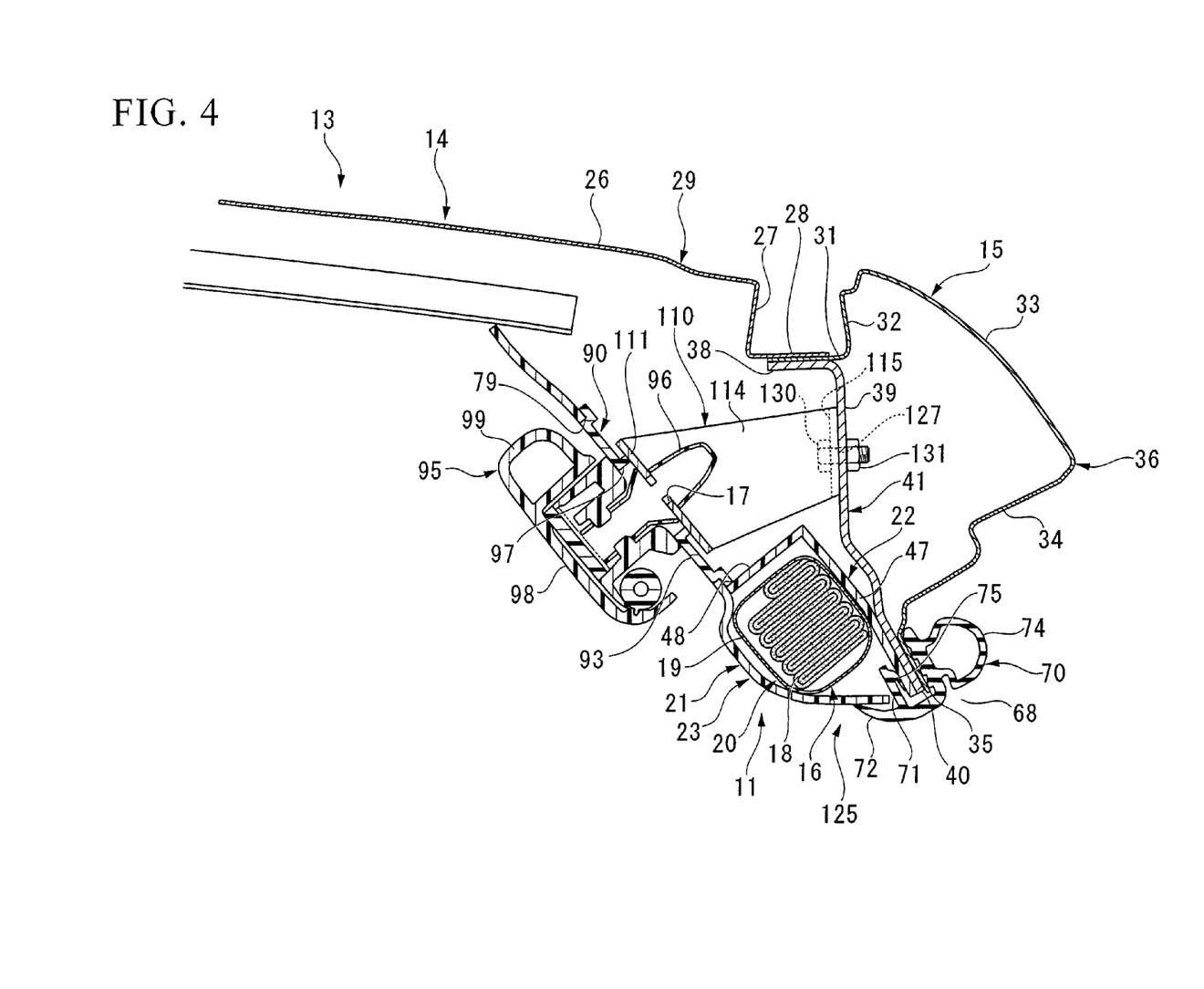
FIG. 4 is a sectional view showing the airbag apparatus of the first embodiment.

As shown in FIG. 4, the airbag apparatus 11 is provided on an inner-face side (i.e., facing the interior of the vehicle) of the corresponding roof side rail 15, and the back-side cover 22 is positioned so as to face the roof side rail 15. The inner-face side (i.e., facing the interior of the vehicle) of the back-side cover 22 is covered with the interior-side cover 21. The interior-side cover 21 and the back-side cover 22 form a case 23 for containing the airbag module 20.

A side portion of the roof 14 has a roof panel 29, an outer panel 36, and a roof side rail inner portion 41, each of which is made of metal.

The roof panel 29 includes (i) a main upper plate part 26 which is substantially arranged horizontally, (ii) a downward extending plate part 27 which extends downward from the outer side end (along the width of the vehicle) of the main upper plate part 26, and (iii) a joint plate part 28 which extends outward along the width of the vehicle from the lower end of the downward extending plate part 27, and is arranged substantially parallel to the main upper plate part 26.

The outer panel 36 includes (i) an inner joint plate part 31 joined to the lower face of the joint plate part 28 of the roof panel 29, (ii) an upward extending plate part 32 which extends upward from the outer side end (along the width of the vehicle) of the inner joint plate part 31, (iii) an outer plate part 33 which extends outward (along the width of the vehicle) and obliquely downward from the upper end of the upward extending plate part 32, (iii) an inward extending plate part 34 which extends inward (along the width of the vehicle) and obliquely downward from the lower end of the outer plate part 33, and (iv) an outer joint plate part 35 which extends outward (along the width of the vehicle) and obliquely downward from the lower end of the inward extending plate part 34.

The roof side rail inner portion 41 includes (i) an upper joint plate part 38 joined to the lower face of the inner joint plate part 31 of the outer panel 36, (ii) a downward extending plate part 39 which extends downward from the outer side end (along the width of the vehicle) of the upper joint plate part 38, and (iii) a lower joint plate part 40 which extends outward (along the width of the vehicle) and obliquely downward from the lower end of the downward extending plate part 39.

The outer panel 36 and the roof side rail inner portion 41 form the roof side rail 15 which extends in the front-back direction of the vehicle and has a closed section.

The back-side cover 22 is attached to the roof side rail inner portion 41 by fitting a plurality of clip parts 45 (see FIG. 2) into attachment holes 46 (see FIG. 5) formed in the roof side rail inner portion 41. More specifically, as shown in FIG. 2, the back-side cover 22 has (i) a main plate part 47 which is arranged on the side of the roof side rail 15 (i.e., on the lower left side in the plane of FIG. 2) and has an elongated shape, and with which the airbag module 20 is covered on the side of the roof side rail 15, (ii) two escape plate parts 48 provided at specific positions on both sides of the main plate part 47 along the length thereof, wherein each escape plate part 48 extends inward (i.e., toward the interior of the vehicle, or toward the upper right side in the plane of FIG. 2) and is substantially perpendicular to the main plate part 47, (iii) a plurality of inclined plate parts 49 arranged at specific regular intervals except for the positions where each escape plate part 48 is provided, wherein each inclined plate part 49 obliquely extends toward the interior of the vehicle, (iv) a plurality of upper plate parts 50, each provided between adjacent inclined plate parts 49 and extending upward so as to form the same plane together with the main plate part 47, and (v) joint plate parts 51 which extend perpendicularly from both sides of each upper plate part 50 and are joined to the inclined plate parts 49 on either side of this upper plate part 50.

Accordingly, between the adjacent inclined plate parts 49, a rib 52 is formed, which consists of (i) the upper plate part 50 which protrudes from the inclined plate parts 49 and (ii) the joint plate parts 51 on either side thereof. In addition, the clip part 45 for attaching the back-side cover 22 to the roof side rail inner portion 41 is formed on each upper plate part 50, and a plurality of fittable holes 53 used for engagement with the interior-side cover 21 is formed in a lower portion of the main plate part 47.

The inclined plate parts 49 are provided (i) at both ends of the back-side cover 22, (ii) on both sides of each escape plate part 48, and (iii) at appropriate positions between these inclined plate parts 49. With respect to the inclined plate parts 49 provided on both sides of each escape plate part 48, a joint plate part 54 is formed between an end of each inclined plate part 49 and an end of the escape plate part 48 in a manner such that the joint plate part 54 is perpendicular to the inclined plate part 49.

Some inclined plate parts 49 have an easily-bending portion 58 on the opposite side of the main plate part 47 (i.e., on the upper side of the inclined plate part 49). The easily-bending portion 58 has an arc shape protruding toward the roof side rail 15. On the opposite side of the inclined plate part 49 with respect to the easily-bending portion 58, a joint plate part 59 is formed which extends upward, parallel to the main plate part 47. Each joint plate part 59 has a joint hole 60 which passes through the joint plate part 59 along the width thereof. Therefore, the easily-bending portion 58 having the arc shape is formed between the inclined plate part 49 and the joint plate part 59, that is, in the middle of the back-side cover 22 along the vertical axis thereof. Therefore, the joint plate part 59 can rotate with respect to the inclined plate part 49 around the easily-bending portion 58 (as the substantial center of the rotation) which is bending. The easily-bending portions 58 and the joint plate parts 59 are provided on the opposite side of the main plate part 47 with respect to the ribs 52, and the easily-bending portions 58 are formed along the upper end of the ribs 52.

The interior-side cover 21 has a plurality of joint parts 64 (having a rod shape) which are inserted into the joint holes 60 of the joint plate parts 59 in the upper portion of the back-side cover 22, and are welded so that each joint part 64 is deformed to have a disc shape (see FIG. 5), thereby joining the interior-side cover 21 to the back-side cover 22. The joint parts 64 are formed in an upper end portion of the interior-side cover 21. When the interior-side cover 21 and the back-side cover 22 are joined to each other as described above, the upper end portions of both covers are overlapped, and the easily-bending portions 58 of the back-side cover 22 are positioned under the overlapped part.

On the other hand, a sealing member 70 is attached to lower end portions of the interior-side cover 21 and the back-side cover 22, so as to seal a gap between a door opening 68 below the roof side rail 15 and a door 69 (see FIG. 1). The sealing member 70 has (i) a fittable plate part 71 inserted and fit into the gap between the interior-side cover 21 and the back-side cover 22, (ii) a protruding part having a tongue-like shape, which extends toward the interior of the vehicle from the lower end of the fittable plate part 71 and contacts the lower side of the interior-side cover 21, (iii) a support part 73 extending toward the outside of the vehicle from the lower end of the fittable plate part 71 and further rising along the outer face (i.e., facing the outside of the vehicle) of the outer joint plate part 35 of the outer panel 36, and (iv) a hollow sealing part 74 provided on the outside of the support part 73 with respect to the interior of the vehicle. The fittable plate part 71 has a fittable piece 75 formed on the outer face thereof, which contacts a lower portion of the back-side cover 22.

As shown in FIG. 2, the interior-side cover 21 has recessed portions 78 whose positions coincide with the escape plate parts 48 of the back-side cover 22 and which are recessed toward the roof side rail 15. The bottom part of each recessed portion 78 has an opening 79 which passes through the recessed portion 78 in the front-back direction thereof. As shown in FIG. 3, on the back side of the bottom part of the recessed portion 78, two upper fittable brackets 83 are provided above the opening 79 and on both sides thereof. Each upper fittable bracket 83 has an extending part 81 which extends toward the outside of the vehicle and a bracket part 82 which protrudes downward from the head of the extending part 81. Similarly, on the back side of the bottom part of the recessed portion 78, two lower fittable brackets 87 are provided below the opening 79 and on both sides thereof. Each lower fittable bracket 87 has an extending part 85 which extends toward the outside of the vehicle and whose position corresponds to that of the upper fittable bracket 83 arranged above, and a fittable part 86 which slightly protrudes upward from the head of the extending part 85.

To the back side of the bottom part of each recessed portion 78 of the interior-side cover 21, an attachment base plate 90 (i.e., an interior finishing member) made of synthetic resin is attached so as to close the opening 79. In the attachment base plate 90, two fittable grooves 91, with which the upper fittable bracket 83 of the interior-side cover 21 are engaged, are formed, and two fittable holes 92, with which the lower fittable bracket 87 are engaged, are also formed. Between the fittable grooves 91 and the fittable holes 92, a protruding portion 93 is formed, which protrudes toward the interior of the vehicle so as to form a step which is fittable to the opening 79. In the protruding portion 93, two through-holes 97 are formed through which attachment clip parts 96 of a passenger's handle 95 (as an interior finishing member) are inserted. Here, the bracket part 82 of each upper fittable bracket 83 has a plate shape and thus has a larger overlapping area with the attachment base plate 90, and in contrast, the fittable part 86 of each lower fittable bracket 87 only slightly protrudes and thus has a smaller overlapping area with the attachment base plate 90. Accordingly, the engagement of the lower fittable brackets 87 of the interior-side cover 21 with the attachment base plate 90 can be released by a relatively small force. In addition, the passenger's handle 95 has the attachment clip parts 96 attached on both ends of the handle in a manner such that the handle is rotatable, and a handle main body 100 which includes extending parts 98 which extend in the same direction from the attachment clip parts 96, and a grip part 99 for connecting the heads of the extending parts 98, which is grasped by a passenger of the vehicle.

Figure 6:
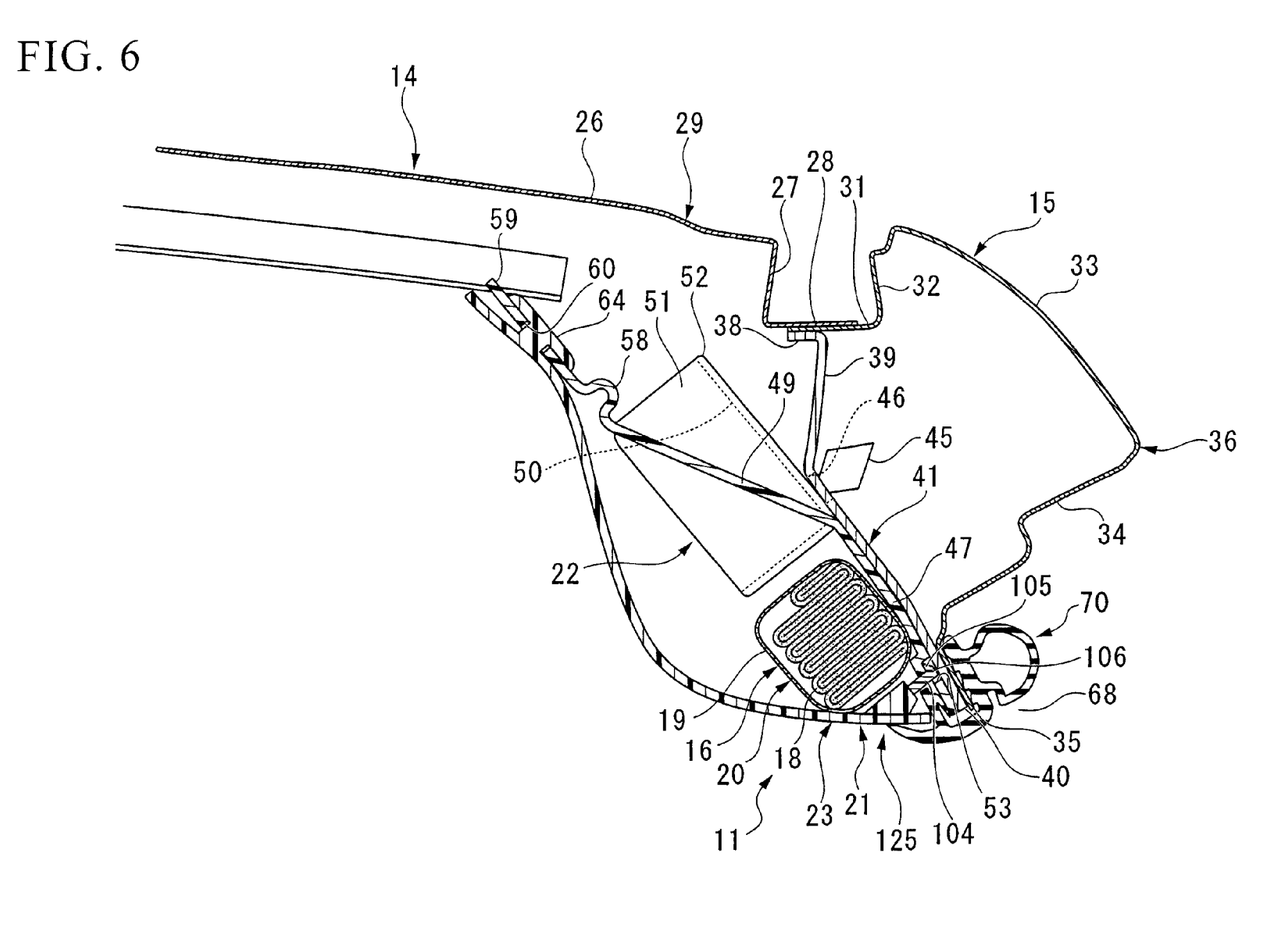
FIG. 6 is also a sectional view showing the airbag apparatus of the first embodiment.
Figure 7:
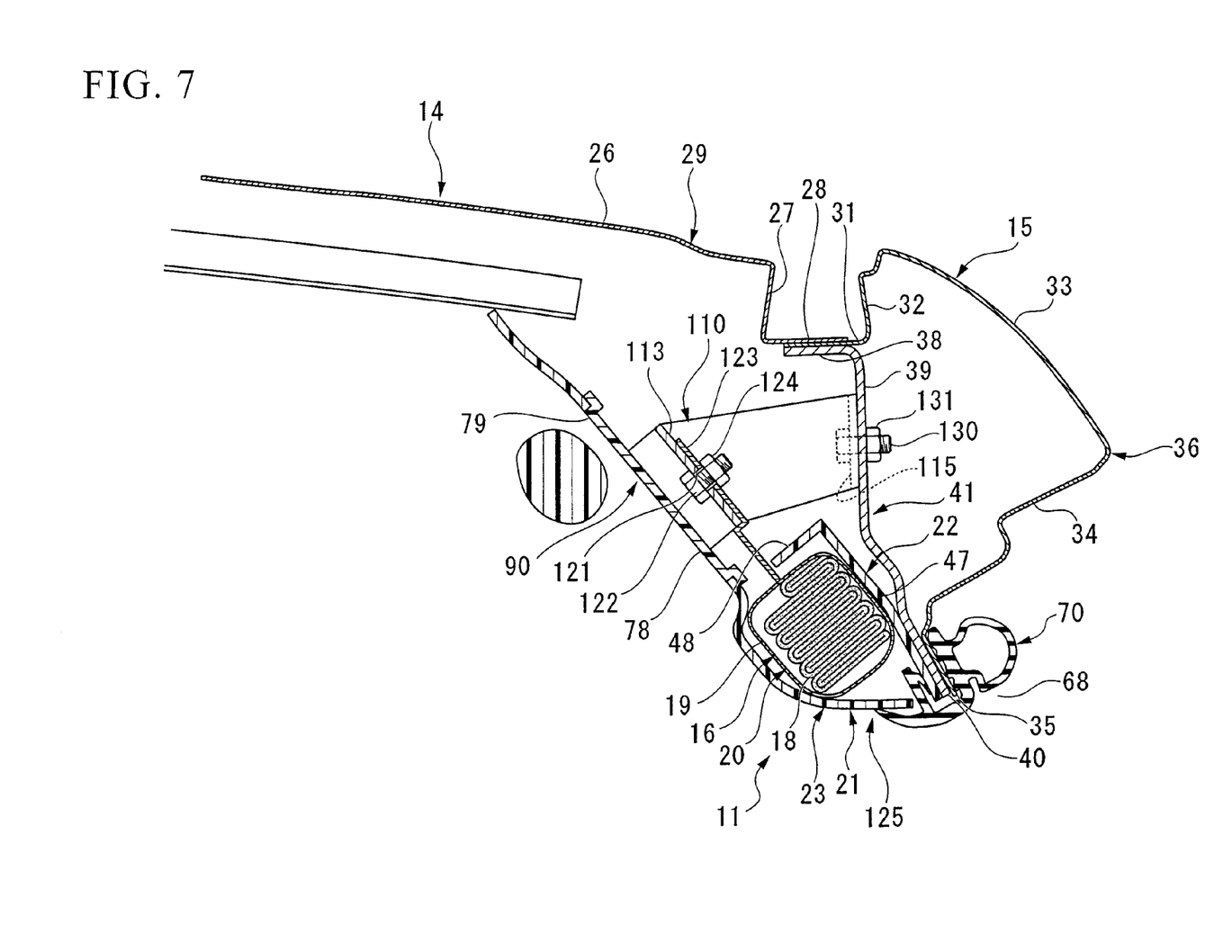
FIG. 7 is also a sectional view showing the airbag apparatus of the first embodiment.

As shown in FIGS. 2 and 6, also in the lower portion of the interior-side cover 21, fittable brackets 106 are formed, each having an extending part 104 which extends toward the outside of the vehicle, and a fittable part 105 which slightly protrudes upward from the head of the extending part 104. The fittable brackets 106 are engaged with fittable holes 53 formed in a lower portion of the main plate part 47 of the back-side cover 22. Here, each fittable part 105 only slightly protrudes and thus has a smaller overlapping area with the back-side cover 22. Therefore, the engagement of the fittable brackets 106 with the back-side cover 22 can also be released by a relatively small force.

As shown in FIG. 4, the attachment base plate 90 is attached to the roof side rail inner portion 41 of the vehicle body 13 via an attachment bracket 110 made of metal. As shown in FIG. 3, this attachment bracket 110 has (i) two contact plate parts 111 whose positions coincide with the through-holes 97 of the attachment base plate 90, (ii) two extending plate parts 112 which slightly extend toward the opposite side of the attachment base plate 90 (i.e., so as to be away from the attachment base plate 90) from one end (facing each other) of the contact plate parts 111, (iii) a central plate part 113 for connecting the heads of the extending plate parts 112, (iv) two extending plate parts 114 which also extend toward the opposite side of the attachment base plate 90 from the other ends of the contact plate parts 111, and (v) attachment plate parts 115 extending from the heads of the extending plate parts 114 towards directions which are separating away from each other.

In the contact plate parts 111, fittable holes 117 are formed, whose positions coincide with those of the through-holes 97 of the attachment base plate 90. As shown in FIG. 4, when the attachment clip parts 96 of the passenger's handle 95, which pass through the through-holes 97 of the attachment base plate 90, are engaged with the fittable holes 117, the passenger's handle 95 is attached to the attachment bracket 110, and in this state, the passenger's handle 95 and the attachment bracket 110 interpose and support the attachment base plate 90. In addition, as shown in FIG. 3, the central plate part 113 of the attachment bracket 110 has an attachment hole 121 formed at the center thereof. When a bolt 122, which is inserted through the attachment hole 121 from the side of the attachment base plate 90, is screwed into a weld nut 124 provided on an attachment piece 123 which protrudes upward from the airbag module 20, the airbag module 20 is attached to the attachment bracket 110.

That is, with reference to FIG. 2, the airbag module 20 is attached to the attachment bracket 110 by using the bolt 122 in advance, and the attachment base plate 90 is also attached to the interior-side cover 21 via the upper fittable brackets 83 and the lower fittable brackets 87 in advance. Then, the attachment clip parts 96 of the passenger's handle 95 are engaged with the attachment bracket 110 while the attachment bracket 110 contacts the attachment base plate 90, thereby fastening the attachment base plate 90 to the attachment bracket 110. Next, the joint parts 64 of the interior-side cover 21 are inserted into the joint holes 60 of the corresponding joint plate parts 59 of the back-side cover 22, and the fittable brackets 106 of the interior-side cover 21, which are formed in an area where the recessed portions 78 are not formed, are also engaged with the fittable holes 53 of the back-side cover 22. In this state, the joint parts 64 are welded to the back-side cover 22. Accordingly, a roof side module 125 is formed, in which the interior-side cover 21, the attachment base plate 90, the passenger's handle 95, the attachment bracket 110, the airbag module 20, and the back-side cover 22 are integrally connected as a module.

Figure 5:
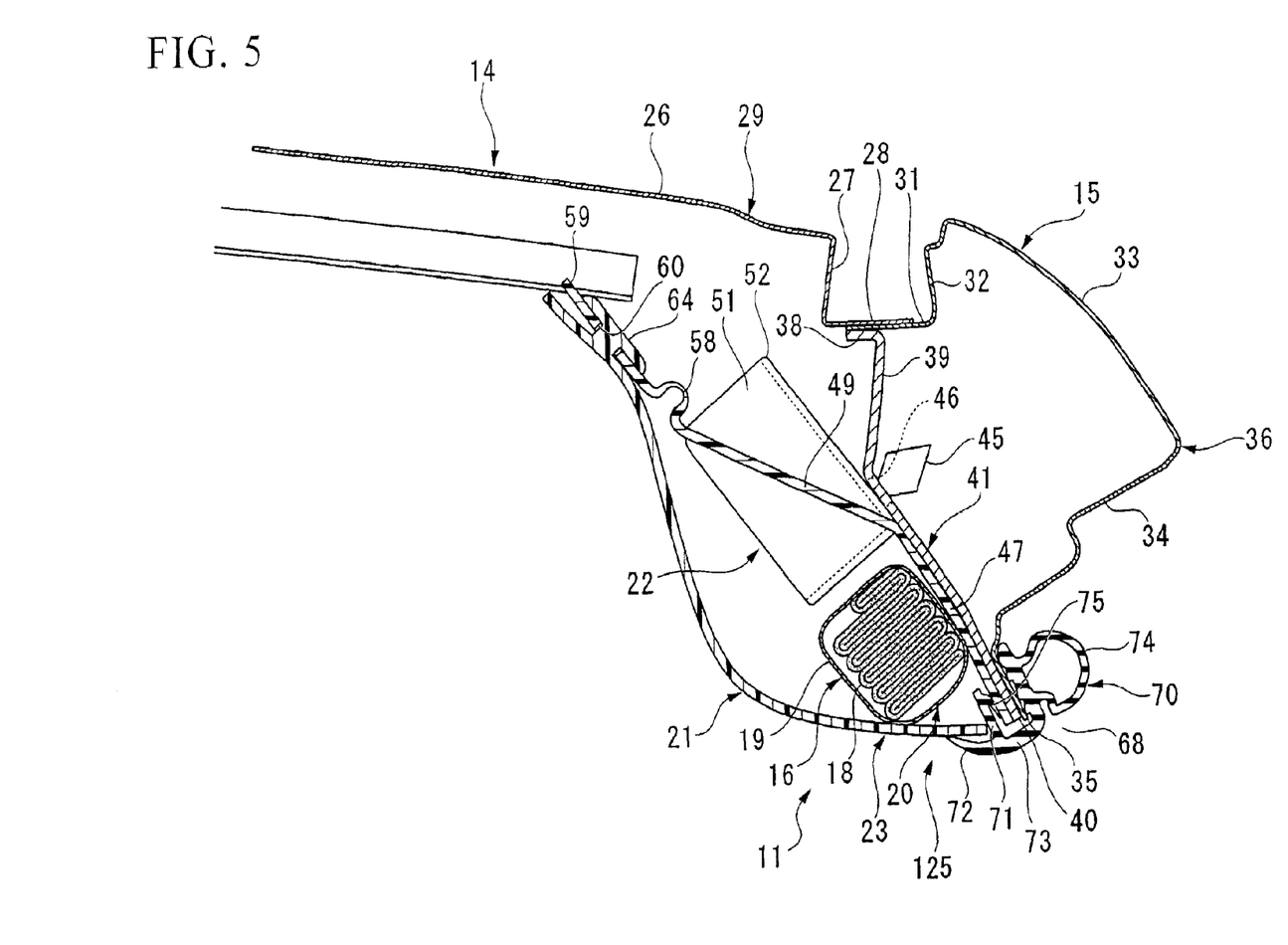
FIG. 5 is also a sectional view showing the airbag apparatus of the first embodiment.

As shown in FIG. 3, each attachment plate part 115 of the attachment bracket 110 has an attachment hole 127, and the interior-side cover 21 has a tool insertion hole 128 whose position corresponds to that of the attachment hole 127. As shown in FIG. 5, the clip parts 45 of the back-side cover 22 are engaged with the attachment holes 46 of the roof side rail inner portion 41, and bolts 130, each being held by a tool inserted through the corresponding tool insertion hole 128 (see FIG. 3), are inserted into the attachment holes 127 of the attachment bracket 110 and then screwed into weld nuts 131 which are fastened to the outer face (i.e., which faces the outside of the vehicle) of the roof side rail inner portion 41 (see FIG. 4), so that the above roof side module 125 is attached to the vehicle body 13. Each tool insertion hole 128 is closed with a detachable cover (not shown).

In accordance with the above processes, the attachment base plate 90 and the passenger's handle 95 are fastened via the attachment bracket 110 to the roof side rail inner portion 41 of the vehicle body 13, and in particular, the attachment base plate 90 among them is detachably engaged with the lower fittable brackets 87 of the interior-side cover 21.

Figure 8:
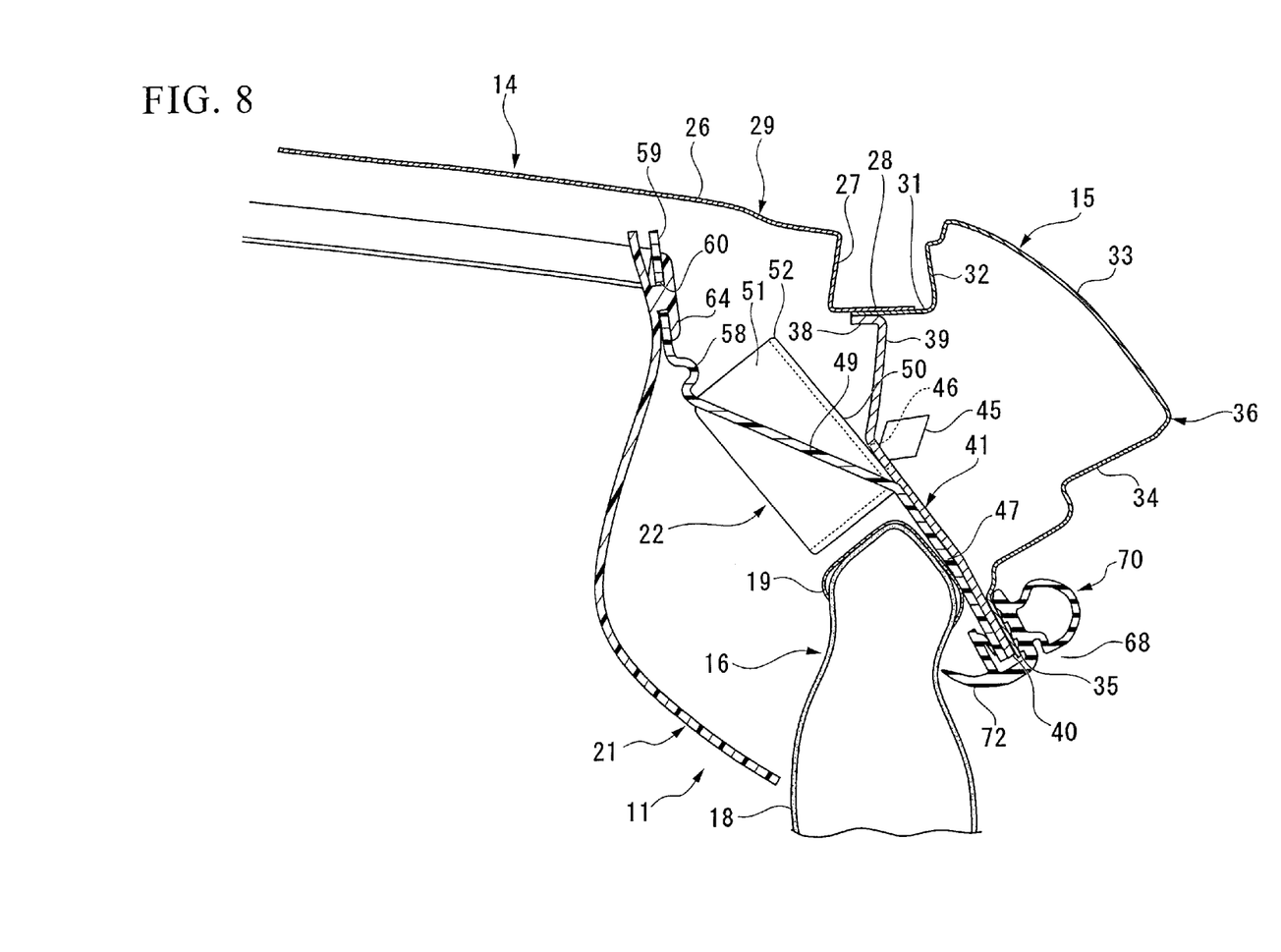
FIG. 8 is also a sectional view showing the airbag apparatus of the first embodiment.

In the airbag apparatus 11 of the first embodiment, when specific conditions for deploying the airbag are satisfied, for example, when the vehicle crashes and gravitational acceleration having a specific value or greater is detected, the inflator 17 is activated so that the folded airbag main body 18 of the airbag 16 expands by the gas generated by the inflator 17 while breaking the cover 19 and extending toward the interior of the vehicle. Therefore, during the deployment, the airbag main body 18 smashes against the lower portion of the interior-side cover 21 and pushes it toward the interior of the vehicle. This pushing force is transmitted to the joint plate parts 59 of the back-side cover 22, which are joined to the upper portion of the interior-side cover 21 (see FIG. 6). Here, the easily-bending portions 58 are present between the joint plate parts 59 and the group of the inclined plate parts 49, upper plate parts 50, and joint plate parts 51 which are fastened to the roof side rail inner portion 41 of the vehicle body 13 and thus whose displacement is restricted. Therefore, as shown in FIG. 8, the joint plate parts 59 and the interior-side cover 21 integrally rotate around the easily-bending portions 58 (as the substantial center of the rotation) which are bending, toward the outside of the vehicle so as to separate the lower portion of the interior-side cover 21 from the back-side cover 22. That is, the easily-bending portions 58 bend by receiving the pushing force of the deploying airbag main body 18, thereby opening the interior-side cover 21 and the back-side cover 22. In this process, the fittable brackets 106 of the lower portion (whose displacement is large) of the interior-side cover 21 are detached from the fittable holes 53 of the back-side cover 22, and the fittable brackets 87 of the lower portion (whose displacement is large) of the interior-side cover 21 are also detached from the fittable holes 92 of the attachment base plate 90. Accordingly, the lower portion of the interior-side cover 21 is separated from the lower portion of the back-side cover 22, and the airbag main body 18 is deployed through a space produced by this separation.

In accordance with the airbag apparatus 11 of the above-described first embodiment, when the airbag 16 is deployed, the pushing force due to the deployment bends the easily-bending portions 58 formed in the back-side cover 22 which is positioned near the roof side rail 15, so that the back-side cover 22 and the interior-side cover 21 (which covers a side of the back-side cover 22, which faces the interior of the vehicle) open, and the airbag 16 further deploys through a space generated by the opening. The easily-bending portions 58 for deploying the airbag 16 are formed in the back-side cover 22;

thus, it is unnecessary to form such easily-bending portions 58 in the interior-side cover 21, and the surface property of the interior-side cover 21 is not influenced by the easily-bending portions (i.e., blowholes or the like on the surface or an uneven surface can be prevented). In addition, each easily-bending portion 58 is provided in the middle of the back-side cover 22 along the vertical directions; thus, appropriate strength can be provided in comparison with the case of forming the easily-bending portion at the end of the back-side cover 22. Therefore, a desirable appearance can be obtained, and simultaneously, appropriate strength can be provided.

Conventionally, a coating or an additional surface member is necessary in order to secure the required surface property of the interior-side cover. However, such a treatment is unnecessary for the interior-side cover 21 of the present embodiment; thus, the cost and weight can be reduced.

In addition, the airbag 16 is contained in the case 23 consisting of the back-side cover 22 and the interior-side cover 21; thus, these elements can be easily attached to the vehicle body 13 and it is possible to prevent the airbag 16 from scarring or the like when the airbag 16 is attached. As the case 23 consists of the back-side cover 22 and the interior-side cover 21, the interior-side cover 21 can also be applied to vehicles in which no airbag 16 is provided. In this case, an impact absorbing member may be provided in place of the airbag 16 at the position where the airbag 16 is to be placed.

When the airbag 16 is deployed, the joint plate parts 59 of the back-side cover 22, which are positioned above the easily-bending portions 58, and the interior-side cover 21 whose upper end joined to the joint plate parts 59 rotate around the easily-bending portions 58 (as the substantial center of the rotation) which are bending, so that the lower portions of the back-side cover 22 and the interior-side cover 21 are separated from each other, and the airbag 16 is further deployed toward the interior of the vehicle. That is, the upper end portions of the back-side cover 22 and the interior-side cover 21 are overlapped and joined, and thus have high rigidity, and the easily-bending portions 58 of the back-side cover 22 are formed along a line under this high-rigidity portion. Therefore, the easily-bending portions 58 can be easily and reliably bent, and the lower portions of the back-side cover 22 and the interior-side cover 21 can be greatly separated from each other even when the amount of bending of the easily-bending portions 58 is small. Additionally, since the easily-bending portions 58 bend, the interior-side cover 21 maintains a constant shape before and after deployment of the airbag 16, as shown by the comparison of FIG. 6 with FIG. 8.

In addition, the ribs 52 for improving the rigidity are formed in the back-side cover 22, and the easily-bending portions 58 are formed along the upper ends of the ribs 52; thus, the easily-bending portions 58 can be easily and reliably bent. As described above, the joint plate parts 59 above the easily-bending portions 58 are overlapped and joined to the interior-side cover 21, and thus this portion also has high rigidity. Therefore, it is possible to more easily and reliably bend the easily-bending portions 58. Here, the easily-bending portions 58 may be thinner than the other portions of the back-side cover 22 so as to reliably bend the easily-bending portions 58 (shown schematically in FIG. 5).

Furthermore, the attachment base plate 90 for holding the passenger's handle 95 is detachably engaged with the lower fittable brackets 87 of the interior-side cover 21. Therefore, even in the above structure in which the passenger's handle 95 and the attachment base plate 90 are attached to the vehicle body 13, the interior-side cover 21 can be detached from the attachment base plate 90 and preferably separated from the back-side cover 22 when the airbag 16 is deployed. Even if the interior-side cover 21 interferes with the passenger's handle 95 when opening, the passenger's handle 95, whose rotational center (which cannot be displaced) is positioned in the opening 79 of the interior-side cover 21, can pass through this opening 79 and thus interference can be avoided. That is, only a displaceable portion of the passenger's handle 95 contacts the interior-side cover 21, and thus opening movement of the interior-side cover 21 is allowed due to the rotation of the passenger's handle 95.

An airbag apparatus 1100 as a second embodiment of the present invention will be explained with reference to FIGS. 9 to 12. In the following explanation, distinctive features of the present invention in comparison with the first embodiment will be specifically discussed. In the figures, parts identical to those in the first embodiment are given identical reference numerals and explanations thereof are omitted.

In comparison with the first embodiment, the airbag apparatus 1100 has a distinctive feature in which the attachment base plate 90 and the back-side cover 22 are integrally formed.

Figure 9:
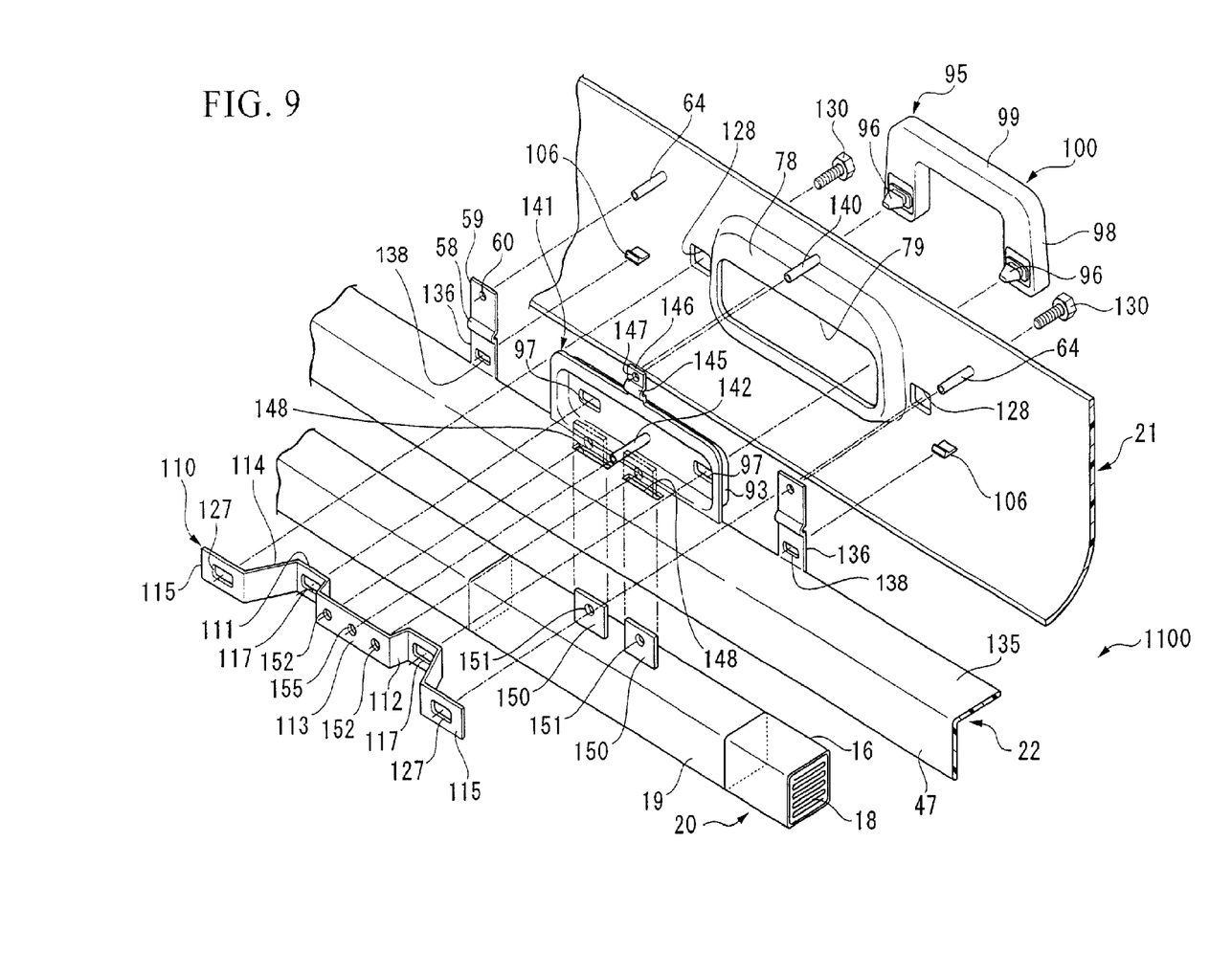
FIG. 9 is a partially-enlarged exploded perspective view showing the airbag apparatus as a second embodiment of the present invention.

As shown in FIG. 9, no upper fittable brackets or lower fittable brackets are formed on the back side of the bottom part of the recessed portion 78, and a joint part 140 (having a rod shape) is formed above the recessed portion 78.

In the back-side cover 22, an inward extending plate part 135 is formed, which extends from the upper end of the main plate part 47 toward the interior of the vehicle. From an end (closer to the interior) of the inward extending plate part 135, upward extending plate parts 136, each extending upward, are formed, and above the upward extending plate parts 136, the joint plate parts 59 are provided via the easily-bending portions 58. As in the first embodiment, each joint plate part 59 has the joint hole 60 through which the corresponding joint part 64 formed in the interior-side cover 21 passes to be welded. Each extending plate part 136 has a fittable hole 138, with which the corresponding fittable bracket 106 formed in the interior-side cover 21 is detachably engaged. In addition, at the end (closer to the interior) of the inward extending plate part 135 of the back-side cover 22, an attachment base plate 141 is integrally formed so as to close the opening 79 of the recessed portion 78 of the interior-side cover 21.

Similar to the attachment base plate 90 of the first embodiment, in the attachment base plate 141, the protruding portion 93 is formed which protrudes toward the interior of the vehicle so as to form a step which is fittable to the opening 79, and in this protruding portion 93, two through-holes 97 are formed through which the attachment clip parts 96 of the passenger's handle 95 pass. Also at the protruding portion 93 of the attachment base plate 141, a joint part 142 having a rod shape is provided, which protrudes toward the opposite side of the interior-side cover 21. In addition, an easily-bending portion 145 having an arc shape is formed above the attachment base plate 141, and a joint plate part 146 is formed on the upper end side of the easily-bending portion 145. Accordingly, also in the attachment base plate 141, the easily-bending portion 145 is formed in the middle of the back-side cover 22 along the vertical directions. The joint plate part 146 has a joint hole 147, and the inward extending plate part 135 of the back-side cover 22 has a plurality of through-holes 148 which are close to the attachment base plate 141.

Figure 10:
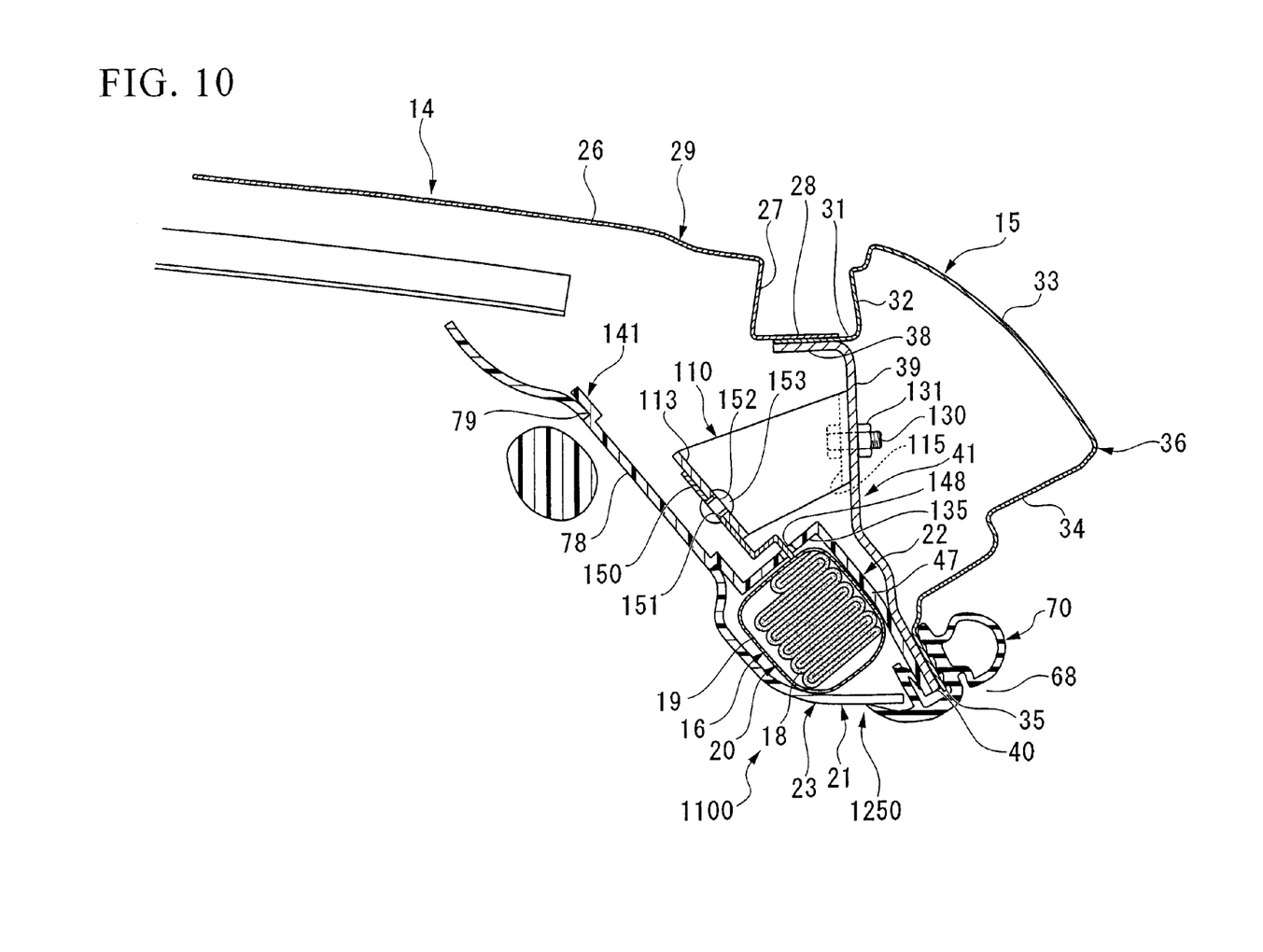
FIG. 10 is a sectional view showing the airbag apparatus of the second embodiment.
Figure 11:
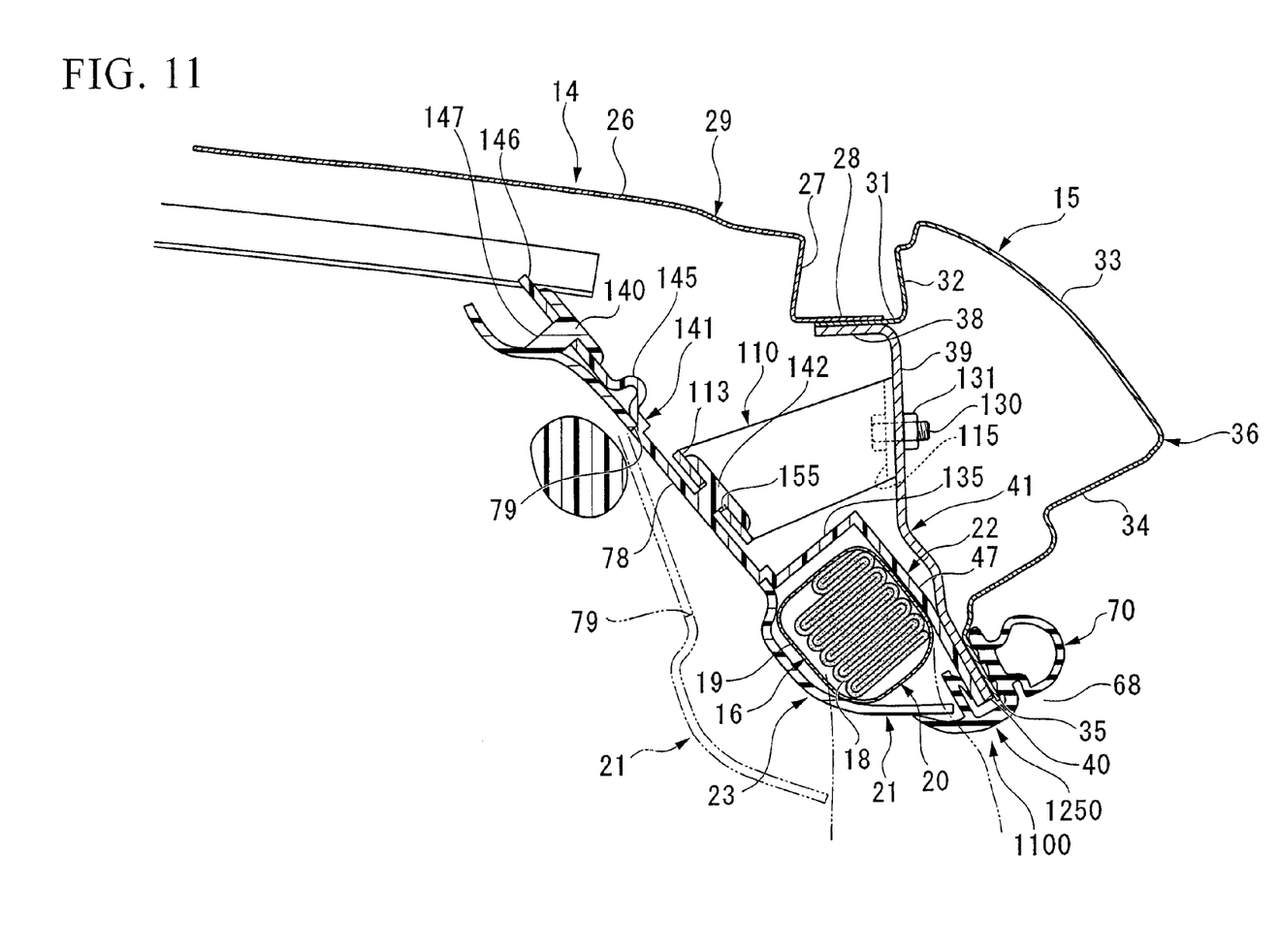
FIG. 11 is also a sectional view showing the airbag apparatus of the second embodiment.
Figure 12:
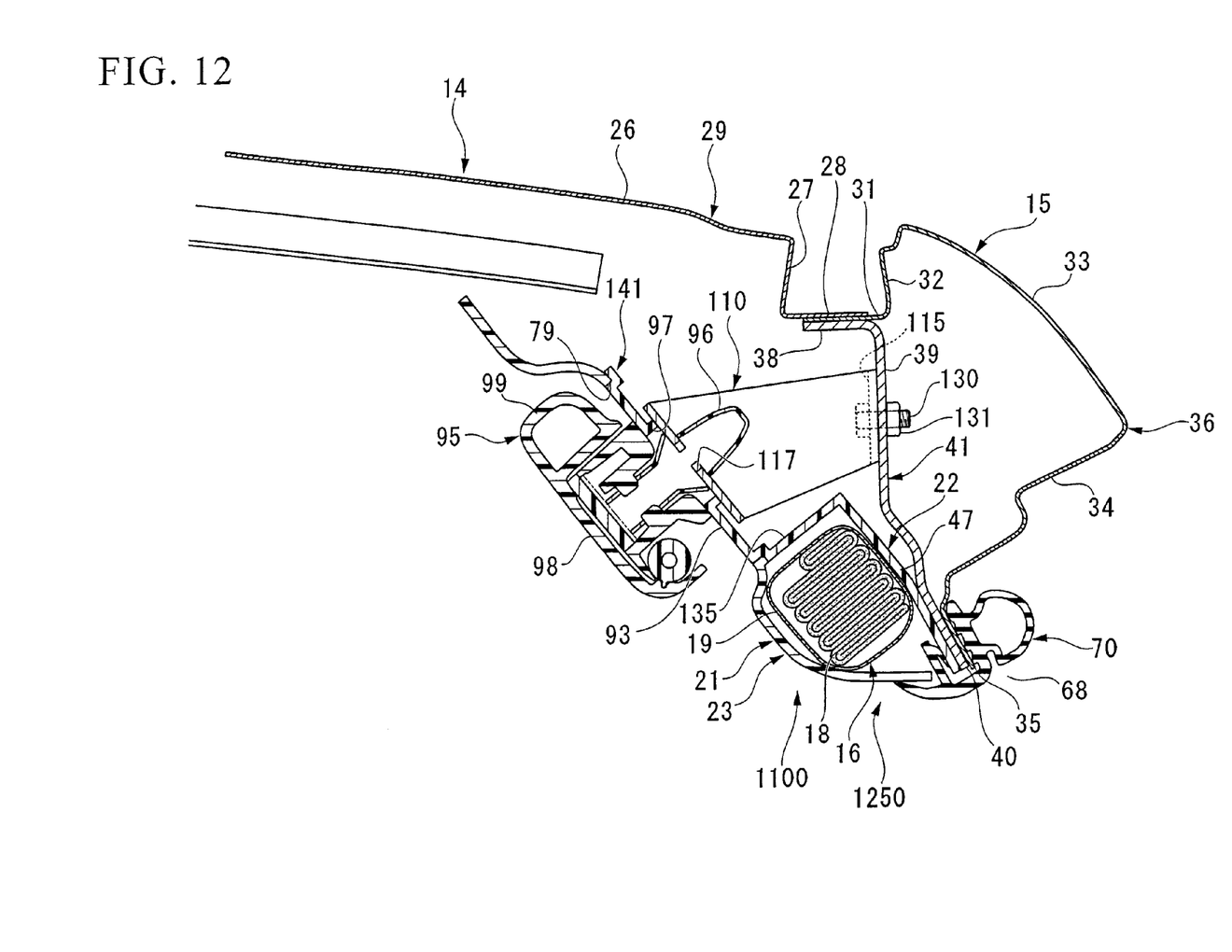
FIG. 12 is also a sectional view showing the airbag apparatus of the second embodiment.

Through these through-holes 148, a plurality of attachment pieces 150 which protrude from the upper face of the airbag module 20 pass. As shown in FIG. 10, in this state, rivets 153, inserted through attachment holes 151 formed in the attachment pieces 150 and also attachment holes 152 formed in the central plate part 113 of the attachment bracket 110, are clamped, thereby fastening the airbag module 20 to the attachment bracket 110. Here, the central plate part 113 of the attachment bracket 110 has a joint hole 155 through which the joint part 142 of the attachment base plate 141 is inserted, and before or after clamping the rivets 153, the joint part 142 inserted through the joint hole 155 is welded to form a disc shape (see FIG. 11), thereby welding the attachment bracket 110 to the back-side cover 22.

Accordingly, each joint part 64 of the interior-side cover 21 is inserted to the corresponding joint hole 60 of the joint plate part 59 of the back-side cover 22 to which the airbag module 20 and the attachment bracket 110 are attached, and the joint part 140 of the interior-side cover 21 is also inserted into the joint hole 147 of the joint plate part 146 of the back-side cover 22. The joint parts 64 and the joint part 140 are each welded to the back-side cover 22. Additionally, before or after this welding, the attachment clip parts 96 of the passenger's handle 95 are inserted through the through-holes 97 of the attachment base plate 141, and then engaged with the fittable holes 117 of the attachment bracket 110 (see FIG. 12). Accordingly, also in the second embodiment, a roof side module 1250 is formed, in which the interior-side cover 21, the passenger's handle 95, the attachment bracket 110, the airbag module 20, and the back-side cover 22 are integrally connected as a module. Similar to the first embodiment, this roof side module 1250 is attached to the vehicle body 13 by inserting the bolts 130, each being held by a tool inserted through the corresponding tool insertion hole 128, into the attachment holes 127 of the attachment bracket 110 and then screwing the bolts 130 into the corresponding weld nuts 131 of the roof side rail inner portion 41.

Also in the airbag apparatus 1100 of the second embodiment, when the airbag 16 expands toward the interior of the vehicle, the deploying airbag 16 smashes against the lower portion of the interior-side cover 21 and pushes it. Accordingly, the joint plate parts 59 and 146 of the back-side cover 22, which are joined to the corresponding joint parts 64 and 140 formed in the upper end portion of the interior-side cover 21, rotate toward the interior of the vehicle together with the interior-side cover 21 while the easily-bending portions 58 and 145 are bending, so as to separate the lower portion of the interior-side cover 21 from the back-side cover 22. Accordingly, as shown by the alternate long and two short dashed line in FIG. 11, the lower portion of the interior-side cover 21 is separated from the lower portion of the back-side cover 22, which produces an opening space through which the airbag 16 is deployed toward the interior of the vehicle. Therefore, effects almost similar to those obtained by the first embodiment can be obtained, and additionally, in accordance with the structure in which the attachment base plate 141 is integrally formed with the back-side cover 22, the number of necessary parts can be reduced, and the attachment can be easily performed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in the above-described first and the second embodiments, the passenger's handle 95 is fastened via the attachment bracket 110 to the vehicle body 13, and the interior-side cover 21 is detachably engaged with the passenger's handle 95, thereby allowing easy displacement of the interior-side cover 21. However, instead of the passenger's handle 95, a similar structure can be established using another element fastened to the vehicle body, such as an air-blow outlet of an air-conditioning system, or an interior lamp.

What is claimed is:

1. An airbag apparatus, comprising:
a back-side cover provided at a roof side rail, said roof side rail being on a side of a roof of a vehicle and extending in a front-back direction of the vehicle, wherein the back-side cover is arranged on a side of the roof side rail that faces an interior of the vehicle;
an interior-side cover for covering a side of the back-side cover that faces the interior of the vehicle; and
an airbag contained in a case formed by the back-side cover and the interior-side cover, wherein
a bending portion is formed in a middle portion of the back-side cover along a vertical direction thereof, and the bending portion bends when receiving a pushing pressure from the airbag that is deploying; and
the airbag deploys toward the interior through a space between the back-side cover and the interior-side cover that opens in accordance with the bending of the bending portion such that the interior-side cover maintains a constant shape before and after the deploying of the airbag.

2. The airbag apparatus in accordance with claim 1, wherein upper end portions of the back-side cover and the interior-side cover are overlapped and joined to each other, and the bending portion is formed along a line under the upper end portions.

3. The airbag apparatus in accordance with claim 2, wherein portions other than the upper end portions and the bending portion of the back-side cover are fastened to a body of the vehicle.

4. The airbag apparatus in accordance with claim 1, wherein the back-side cover has a rib, and the bending portion is formed along an upper end of the rib.

5. The airbag apparatus in accordance with claim 1, wherein an interior finishing member is fastened to a body of the vehicle, and is detachably engaged with the interior-side cover.

6. The airbag apparatus in accordance with claim 5, wherein the interior-side cover has an opening through which the interior finishing member fastened to the body of the vehicle can pass.

7. The airbag apparatus in accordance with claim 5, wherein the interior finishing member is a passenger's handle.

8. An airbag apparatus for a vehicle, comprising:
a back-side cover provided at a roof side rail, said roof side rail being on a side of a roof of the vehicle and extending in a front-back direction of the vehicle, wherein the back-side cover is arranged on a side of the roof side rail that faces an interior of the vehicle, and wherein said back-side cover includes a bending portion of reduced thickness with an arc shape that protrudes toward the roof side rail and is formed in a middle portion of the back-side cover along a vertical direction thereof;
an interior-side cover that covers a side of the back-side cover that faces the interior of the vehicle; and
an airbag for deploying toward the vehicle interior, said airbag being contained in a case formed by the back-side cover and the interior-side cover, wherein
the back-side cover includes a first end that is attached to a first portion of the interior-side cover at a location above the airbag, the first end extending into the bending portion, the back-side cover further includes an inclined plate part extending from the bending portion to a main plate part, the main plate part of the back-side cover cooperating with a second portion of the interior-side cover to provide a space through which the airbag deploys, and wherein said space is created by flexing of the back-side cover at the bending portion due to a pushing pressure from the deploying airbag.

9. The airbag apparatus in accordance with claim 8, wherein the first end of the back-side cover and the first portion of the interior-side cover are overlapped, and the bending portion is formed along a line under the first end and the first portion.

10. The airbag apparatus in accordance with claim 9, wherein portions other than the first end and the bending portion of the back-side cover are fastened to a body of the vehicle.

11. The airbag apparatus in accordance with claim 8, wherein the back-side cover has a rib, and the bending portion is formed along an upper end of the rib.

12. The airbag apparatus in accordance with claim 8, wherein an interior finishing member is fastened to a body of the vehicle, and is detachably engaged with the interior-side cover.

13. The airbag apparatus in accordance with claim 12, wherein the interior-side cover has an opening through which the interior finishing member fastened to the body of the vehicle can pass.

14. The airbag apparatus in accordance with claim 12, wherein the interior finishing member is a passenger's handle.

* * * * *